United States Patent [19]
Reinisch

[11] Patent Number: 5,282,101
[45] Date of Patent: Jan. 25, 1994

[54] DISC DRIVE GASKET AND METHOD OF FORMING SAME

[75] Inventor: Ronald F. Reinisch, Soquel, Calif.

[73] Assignee: Seagate Technology, Inc., Scotts Valley, Calif.

[21] Appl. No.: 958,486

[22] Filed: Oct. 8, 1992

Related U.S. Application Data

[63] Continuation of Ser. No. 518,219, May 3, 1990, abandoned.

[51] Int. Cl.$^5$ .................... G11B 33/14; C08J 9/00
[52] U.S. Cl. ................... 360/97.03; 360/97.02; 521/50.5
[58] Field of Search ............... 360/97.01, 97.02, 97.03, 360/97.04, 98.01; 428/158; 521/50.5; 220/228, 344, 461

[56] References Cited

U.S. PATENT DOCUMENTS

| | | | |
|---|---|---|---|
| 4,078,701 | 3/1978 | Clubb | 220/4.27 |
| 4,186,068 | 1/1980 | Rubens | 521/95 |
| 4,333,978 | 6/1982 | Kocher | 428/163 |
| 4,624,784 | 11/1986 | Lefebvre | 210/356 |
| 4,717,034 | 1/1988 | Mumford | 215/318 |
| 4,851,099 | 7/1989 | Brereton | 204/256 |
| 4,882,108 | 11/1989 | Nakajima et al. | 264/54 |
| 4,896,231 | 1/1990 | Hoppe | 360/97.02 |
| 5,150,267 | 9/1992 | Reinisch | 360/97.02 |

*Primary Examiner*—A. J. Heinz
*Assistant Examiner*—Jeff Evans
*Attorney, Agent, or Firm*—Flehr, Hohbach, Test, Albritton & Herbert

[57] ABSTRACT

A gasket for a disc drive system having a recording media within a sealed housing having top and bottom casing members, a read/write head for transferring information between the recording media and an external system and a head positioner assembly for locating the head relative to the recording media, the improvement comprising a gasket for sealing a connection between the top and bottom casing members. The gasket includes a liner sheet for lateral stability during thermo cycling and opposing layers of a foam material flame bonded to the liner sheet. The foam material is polypropylene.

10 Claims, 4 Drawing Sheets

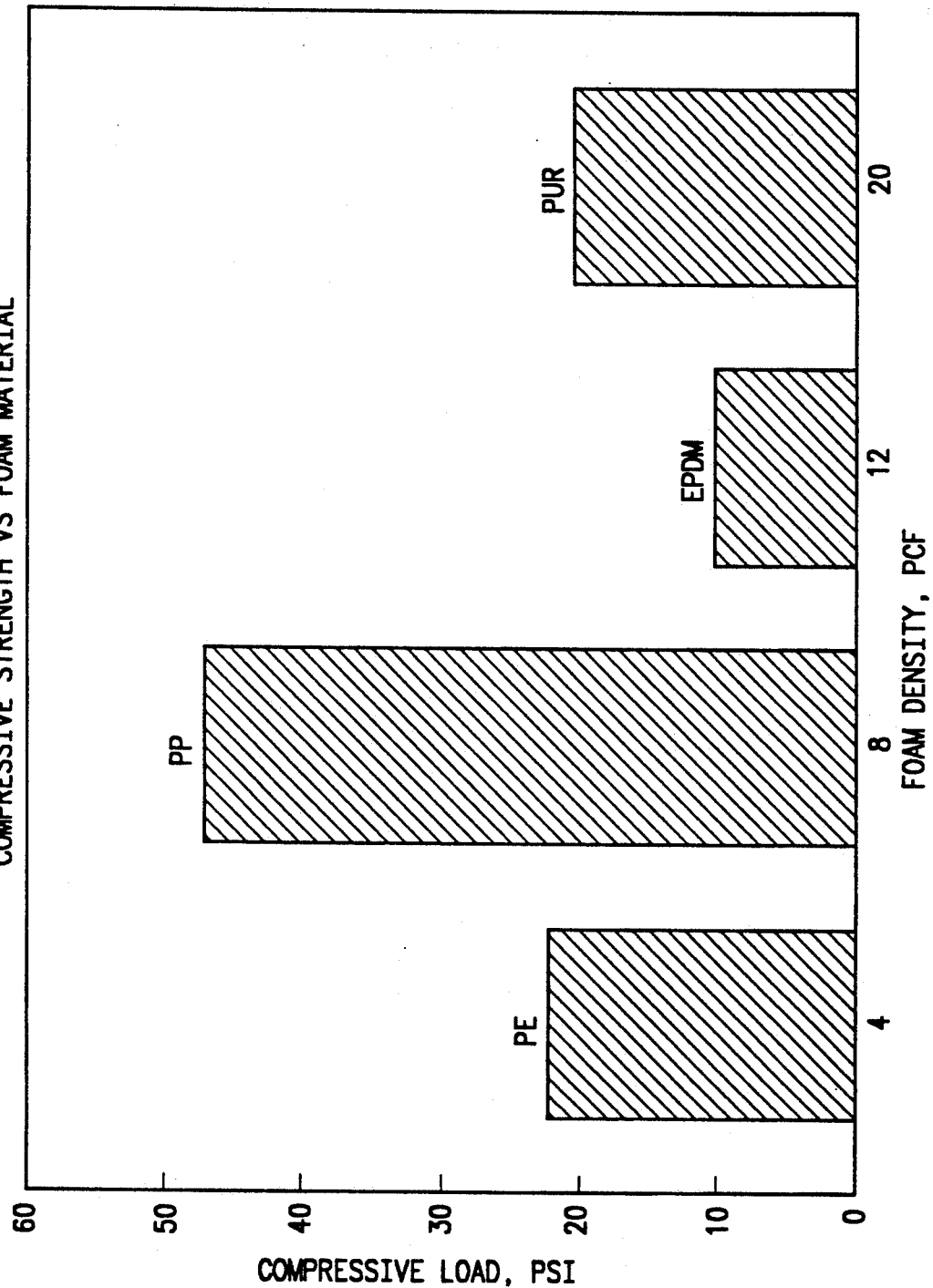

DISC DRIVE GASKET AND METHOD OF FORMING SAME

This is a continuation, of application Ser. No. 07/518,219 filed May 3, 1990 now abandoned.

BACKGROUND OF THE INVENTION

The present invention relates generally to an improved gasket configuration for sealing and dampening vibrations in a magnetic disc drive casing.

SUMMARY OF THE PRIOR ART

Disc drive machines record and reproduce information stored on magnetic media. Conventional Winchester-type disc drives include a plurality of vertically aligned rotating information storage discs journaled about a spindle motor assembly with a housing. Magnetic discs each have at least one associated magnetic head that is adapted to transfer information between the disc and an external system. Each head is carried by an elongated flexure arm. The flexure arms are vertically aligned and are each attached to a common head positioner assembly. The head positioner assembly is adapted to move the heads back and forth in unison across the face of the vertically aligned discs. The head positioning assembly may be either rotationally actuated along an arc, or may take the form of a linear carriage that is free to move back and forth along a single axis.

In either case, the head positioner assembly is adapted to rapidly and precisely position the heads relative to the magnetic discs. Rapid movement of the various components, including the spindle motor, the head positioner assembly and the discs tend to generate a wide variety of undesirable vibrations between the disc drive.

The housing is typically divided into upper and lower casings which are sealed together with a gasket to prevent the introduction of particulate-laden air into the disc drive. The gasket also serves to dampen vibrations within the housing. Conventional gaskets suffer two primary drawbacks. Initially, gaskets that are thick enough to provide good dampening and sealing characteristics tend to bulge outward when compressed between the upper and lower casings. Additionally, conventional gaskets lack any structural rigidity and thus are difficult to position on the casing for production. The extra time spent at repositioning gaskets in the middle of the production line increases both the time and cost involved in producing disc drives.

Another important consideration in the production of magnetic memory drives that use rigid discs for recording data is the elimination of particle contamination. These discs require low levels of particulate contamination to prevent physical damage to the read/write heads as well as to the disc surface. Although careful attention is paid to the cleanliness of all components installed in the interior of a disc drive, it is essential to prevent the intrusion of atmospheric contaminants into the drive cavity during drive operation in manufacturing and in customer service. The computer industry employs gaskets to seal the gap between the base and top cover of a conventional box-like structure used to contain magnetic recording elements. Flexible foams or rubbery materials have been used as gasket material. A gasket using such rubbery material is disclosed in U.S. Pat. No. 4,896,231, issued to Robert F. Hoppe for a Backbone Gasket for Disc Drives. State-of-the-art foam gaskets can cause contamination from the use of inorganic filler compounds, such as koalinite, clay or calcium carbonate. These filler compounds are often present on the surface of the cut edge of the foam gasket and when shed are a source of particulate contamination.

Furthermore, organic adhesives are required to bond the foam gasket to other surfaces. These adhesives are often a source of contamination by outgassing or migrating. Since foam gaskets are often fabricated by skiving sheets from thick buns followed by die-cutting the sheets, the cut surface is an additional source of contamination by shedding of exposed loose particles as well as a cause of poor sealing because of presence of open cells and blow holes.

An additional shortcoming of the foam and rubber gasket of the prior art is that they are labor intensive in their manufacturing, requiring multiple reeling and unreeling steps. Current foam rubber laminated gaskets, such as those which utilize ethylene-propylene-diene (EPDM) in a laminated gasket are susceptible to lateral shifting with respect to the liner sheet especially during thermal cycling under vertical pressure (the compression of the gasket between the upper and lower casting members). To alleviate this lateral slippage a plurality of adhesive strips (eight) are bonded to the edges of the gasket at strategic locations. The foam and rubber gaskets, as mentioned above, possess open cells and blow holes because of their inherent structure and die cutting procedures. These open cells and blow holes harbor contaminants which necessitate a washing and drying of the gasket components after assembly and before installation. These extra manufacturing steps significantly increase the cost and time required to complete gasket assembly. Disc drive assembly time is also extended because of the lack of rigidity in foam gaskets. A more rigid gasket is desired that can be easily installed in one quick movement and readily aligns with the upper and lower faces of the casing members.

SUMMARY OF THE INVENTION

Accordingly, it is a primary objective of the present invention to provide a disc drive gasket of a material having a high compressive strength to produce a leak proof seal.

Another objective of the present invention is to provide a disc drive gasket of a radiation-cured, crosslinked foam.

Another objective of the present invention is to provide a disc drive gasket of a material containing no inorganic filler material.

Another objective of the present invention is to provide a disc drive gasket which only outgasses water at 70 degrees C.

Another objective of the present invention is to provide a disc drive gasket with increased structural rigidity over those of the prior art.

To achieve the foregoing and other objectives, in accordance with the purpose of the present invention, a gasket is provided for a disc drive system having magnetic information storage media located within a sealed housing. The housing includes top and bottom casing components that are clamped together with the gasket disposed therebetween to seal the drive. The gasket includes a very thin liner sheet which is made of high density polypropylene which is sandwiched between a pair of substantially thicker radiation-cured, crosslinked polypropylene foam layers.

The polypropylene foam material offers high compressive strength and is not made with inorganic filler material. The foam layers are chosen to have good vibration dampening characteristics. The foam layers are also chosen to be fire retardant in compliance with UL standards. Furthermore, the polypropylene foam outgasses only water at 70 degrees C.

BRIEF DESCRIPTION OF THE DRAWINGS

The invention, together with further objects and advantages thereof, may best be understood by reference to the following description taken in conjunction with the accompanying drawings.

FIG. 5 illustrates the relative compressive strengths of several foam materials having different densities.

DETAILED DESCRIPTION OF THE PREFERRED EMBODIMENT

Figure 1:
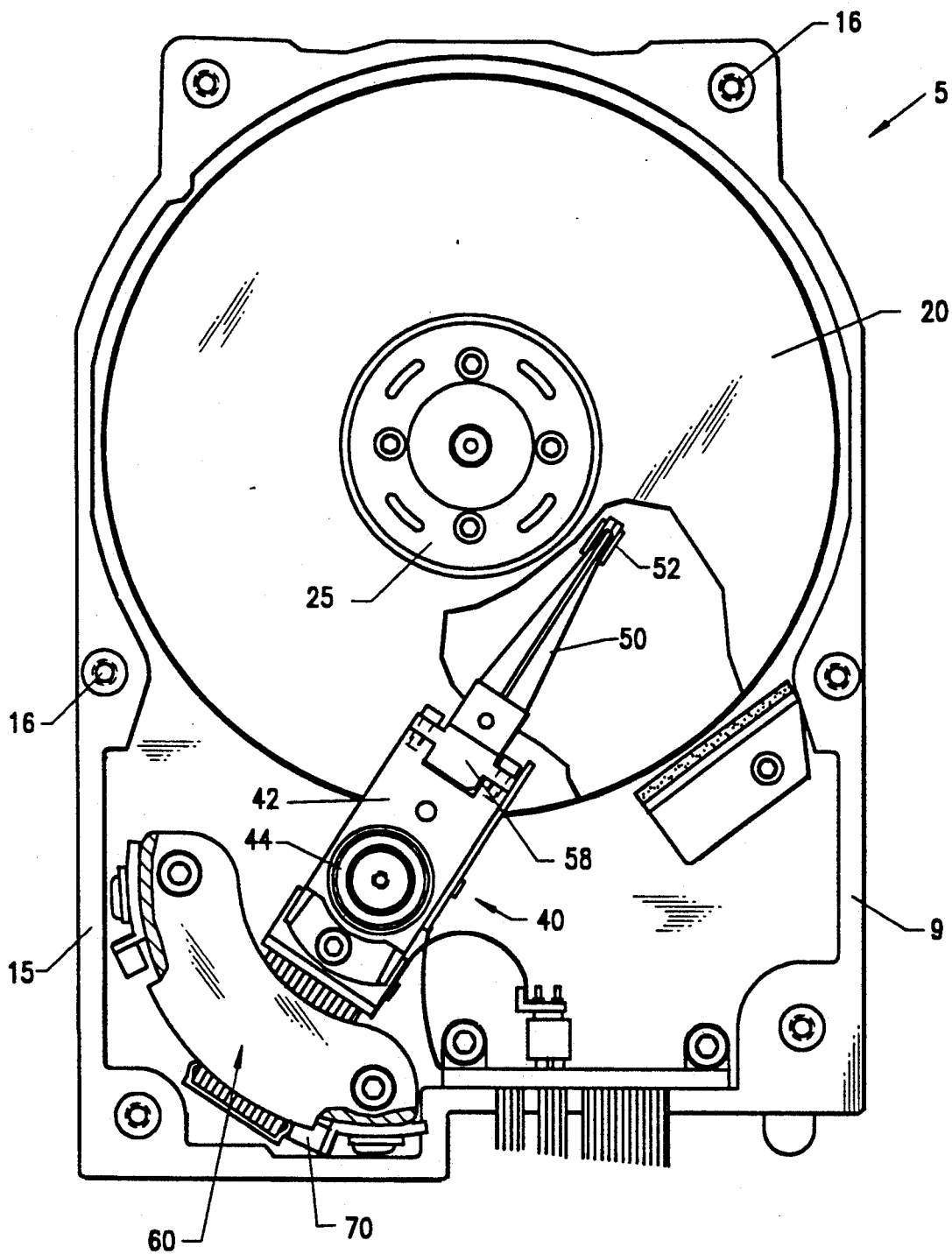
FIG. 1 is a diagrammatic top view of a disc drive that incorporates the present invention with its upper casing removed.
Figure 2:
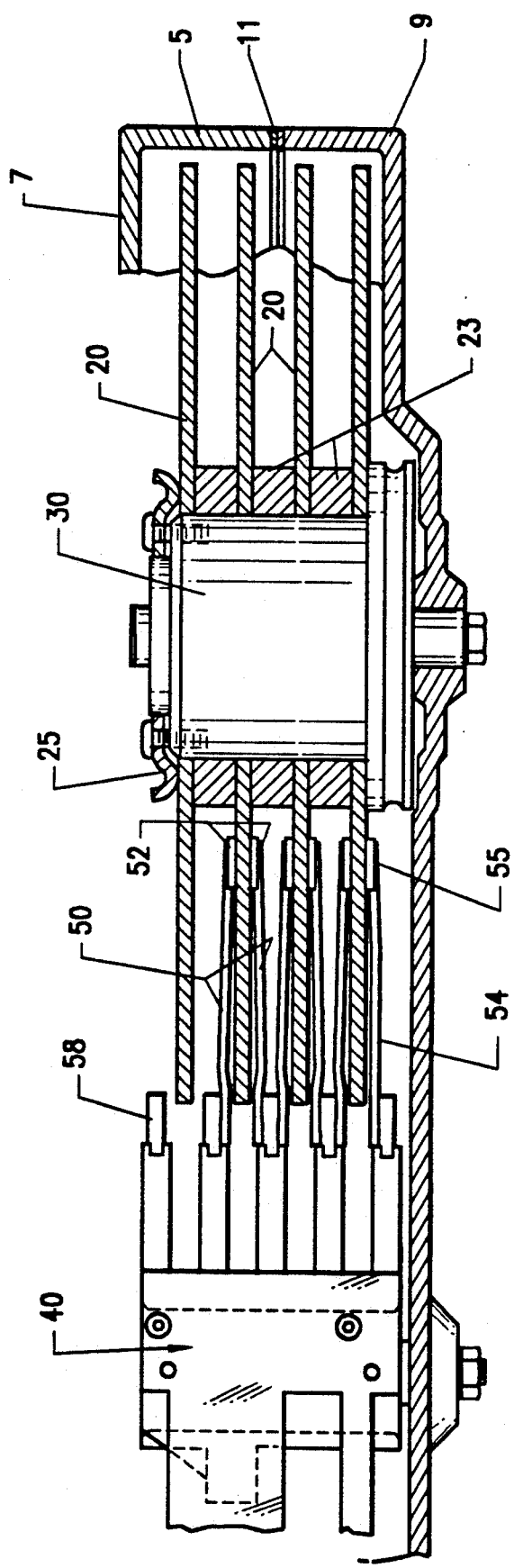
FIG. 2 is a diagrammatic side view of the disc drive shown in FIG. 1.

Referring to FIGS. 1 and 2, a disc drive constructed in accordance with the present invention includes a housing 5 having upper casing member 7 and lower casing member 9. The gasket 11 is disposed between the top and bottom casing members 7 and 9 to provide an airtight seal and to provide some damping for vibrations within the housing.

A disc drive system suitable for incorporating the teachings of the present invention is shown in diagrammatic form. A plurality of information carrying magnetic discs 20 are journaled about a spindle motor assembly 30 within a housing 5 having upper and lower casing members 7 and 9, respectively. Each magnetic disc 20 has a multiplicity of concentric information storage tracks for recording information. A head positioner assembly 40 is rotatably actuated between the upper and lower casing members 7 and 9 in one corner of the housing 5. The head positioner assembly 40 carries a plurality of flexure arms 50 that each carry a magnetic data head 52 for reading information from, and writing information onto, the magnetic discs 20. The head positioner assembly 40 also carries a servo arm 54 which carries a servo head 55 for accurately positioning the data heads 52 relative to the information storage tracks 22. A voice coil motor 60 is adapted to rotate the head positioner assembly back and forth such that the heads move in unison across the information storage discs. A magnetic latch 70 holds the head positioner assembly 40 in place when the disc drive is not in use.

Figure 3:
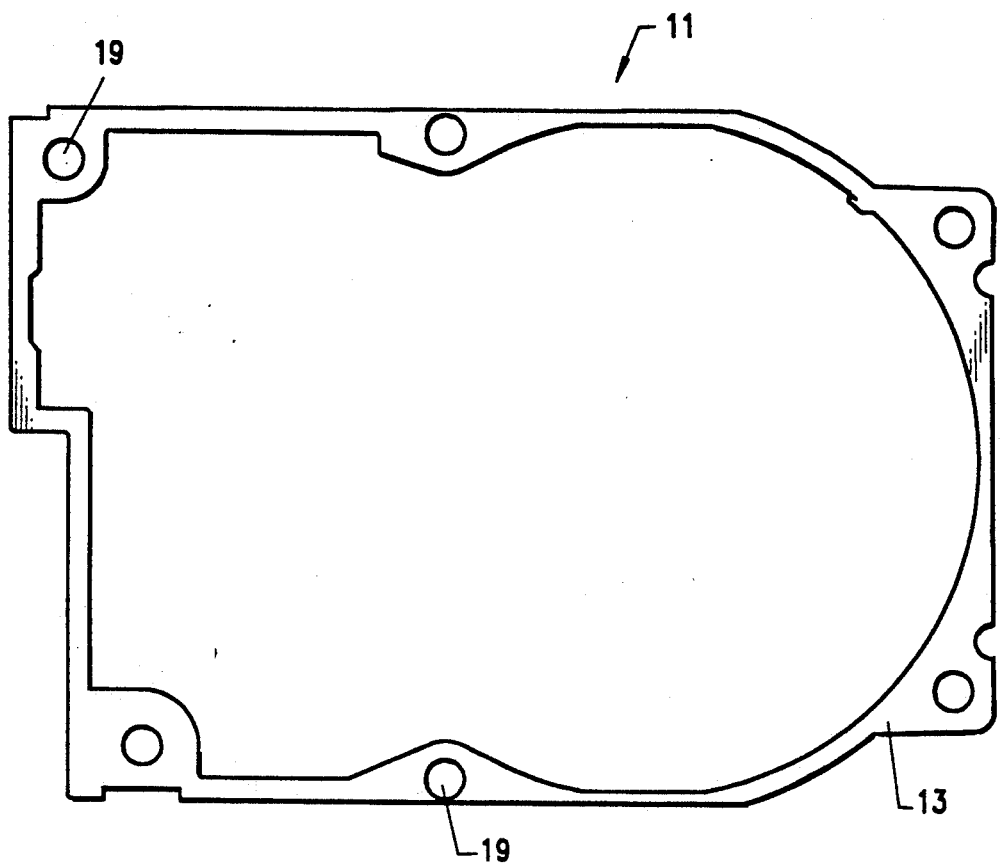
FIG. 3 is a top view of the disc drive gasket of the preferred embodiment.
Figure 4:
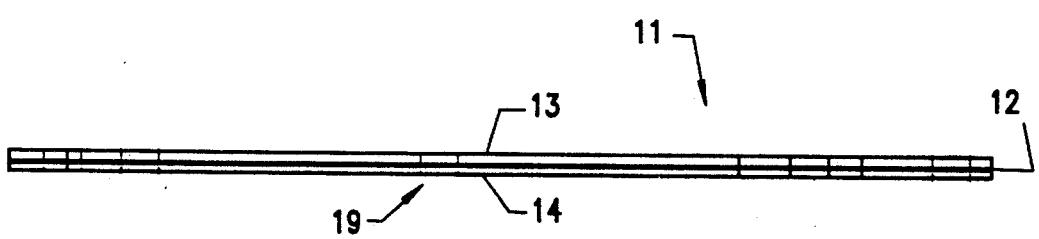
FIG. 4 is a side view of the disc drive gasket of the preferred embodiment.

Referring next to FIGS. 3 and 4, a gasket 11 of the preferred embodiment is shown. The gasket 11 is disposed between the top and bottom casing members 7 and 9, as indicated in FIG. 2, to provide an airtight seal and to provide some damping for vibrations within the housing. The gasket 11 is configured generally to have the same surface dimensions as surface 15 (illustrated in FIG. 1). The gasket 11 has a plurality of bore holes 19. These bore holes 19 fit about the six illustrated screw holes 16 which are utilized in mounting the lower casing member 9 to the upper casing member 7.

The gasket 11 of the preferred embodiment is basically comprised of three components. A first and second layer of polypropylene foam 13 and 14 are utilized to provide the sealing and damping function of the gasket 11. A liner sheet 12 is provided which is made of a higher density polypropylene. The liner sheet 12 provides lateral stability to the gasket 11, particularly during thermo cycling. As indicated in FIG. 4, the liner sheet 12 is sandwiched between the top foam layer 13 and the bottom foam layer 14. Generally, the liner sheet 12 and the foam layers 13 and 14 have the same surface configuration (for the surface illustrated in FIG. 3), i.e., the liner sheet 12 has bore holes 19 at the same location as the foam layers 13 and 14.

In the gasket 11 fabrication process the polypropylene foam layers 13 and 14 are flame bonded to the liner sheet 12. Flame bonding produces a good seal between the two surfaces without decomposing either material. The top and bottom layer 13 and 14 are constructed of polypropylene foam which is radiation cured and comprised of cross-linked polymer chains. Cross-linked polymers are immobilized chains which do not flow, even at high temperatures, thus making the gasket 11 of the present invention more stable than prior art gaskets which melt or become brittle at high temperatures.

The gasket 11 of the preferred embodiment uses high density polypropylene liner sheet material and polypropylene foam material, i.e. essentially the same material for liner and foam layer. This similarity provides a combination of materials that greatly reduces geometric distortion (i.e., buckling, cupping, or lateral shifting) of the compressed, laminated gasket caused during multiple thermal cycling of the disc drive over the temperature range of −40° C. to +70° C. Thus, the gasket 11 of the preferred embodiment of the invention identifies a unique combination of a radiation-cured foam that is thermally bonded to either face of a liner sheet which provides a disc drive gasket with increased structural rigidity over those of the prior art.

Furthermore, unlike the rubber gaskets of the prior art which are cut on all sides and, therefore, have open cells on all surfaces, the polypropylene foam of the top and bottom layers 13 and 14 is fabricated by extrusion and has smooth, unporous top and bottom surfaces. Although the "sides" of the gasket 11 (those surfaces created by cutting the extruded foam material into a gasket shape) may have open the cells, the elimination of open holes on the major surfaces of the gasket 11 greatly reduces the amount of contaminants induced into the disc drive environment. The amount of contaminants is further reduced by the use of polypropylene foam because it does not require the fill material added to rubber based gaskets to provide extra strength and rigidity.

Referring to FIG. 5, a comparative graph of the compressive strength of various foam materials is shown. Compressive strength at 50% deflection is an important characteristic because it is directly proportional to sealing ability. The greater the elastic compressive strength of a material, the more leak proof a seal created by that material will provide. The graph of FIG. 5 illustrates polyethylene (PE), polypropylene (PP), ethylene-propylene-diene (EPDM) and polyurethane (PUR). Polypropylene has a compressive strength of approximately 46 psi at 8 pcf (pounds per cubic foot). It is evident from the graph that polypropylene provides the greatest compressive strength per level of foam density and hence forms the most leak proof seal at room temperature as well as at 60° C.

Although the present invention has been described by way of the preferred embodiment which utilizes polypropylene foam, other materials may be used. Generally, a material for use in the present invention should have the following characteristics: (1) high compressive strength; (2) cross linked polymer chains (ideally formed by radiation curing); (3) contain no filler material; (4) be extruded to form surface skin (no open cells); and (5) be capable of flame bonding to a polyolefin sheet.

Although only a few embodiments of the present invention have been described herein, it should be understood that the present invention may be embodied in many other specific forms without departing from the spirit or scope of the invention. Particularly, it should be appreciated that the actual materials used to form the foam layers may be varied within the dictates of the above teaching. Further, the gasket may be used in conjunction with any disc drive arrangement. Therefore, the present examples and embodiments are to be considered as illustrative and not restrictive, and the invention is not to be limited to details given herein, but may be modified within the scope of the appended claims.

What is claimed is:

1. In a disc drive system having a recording media within a sealed housing having top and bottom casing members, a read/write head for transferring information between said recording media and an external system and a head positioner assembly for locating said head relative to said recording media, the improvement comprising a gasket for sealing a connection between said top and bottom casing members, said gasket including:
    a liner sheet for lateral stability during thermal cycling; and
    opposing layers of a foam material formed on said liner sheet, said foam material having a compressive strength of greater than 30 p.s.i. for about 50% compression for a foam density of about 8 p.c.f. to optimize the sealing ability of said gasket;
    said foam material having outgassing characteristics of only outgassing water at 70° C.;
    wherein said opposing layers are flame bonded to said liner sheets, and said liner sheet and said foam layer are in the same material to optimize the stability of and to minimize the geometric distortion of said gasket during thermal cycling of said disc drive system.

2. The system of claim 1 wherein said foam material is polypropylene foam to maximize the stability of the gasket under wide ranges of temperature.

3. The system of claim 1 wherein said foam material is formed of cross linked polymer chains.

4. The system of claim 3 wherein said cross linked polymer chains are formed by radiation curing.

5. The system claim 1 wherein said foam material contains no filler material.

6. The system of claim 1 wherein said foam material has at least one surface having a skin thereon which has no open cells to minimize the possible introduction of contaminants into said disc drive wherein said skin is formed by extrusion.

7. The system of claim 1 wherein said foam material outgasses only water at 70 degrees C.

8. A gasket for use in a disc drive assembly for sealing a connection between an upper and lower casing member, comprising:
    a liner sheet for lateral stability; and
    opposing layers of foam material connected to said liner sheet, said foam material being fabricated of cross linked polymer chains for rigidity throughout a broad temperature range;
    said foam material having outgassing characteristics of only outgassing water at 70° C.;
    wherein said opposing layers are flame bonded to said liner sheets, and said liner sheet and said foam layer are the same material to optimize the stability of and to minimize the geometric distortion of said gasket during thermal cycling of said disc drive assembly.

9. In a disc drive system having a recording media within a sealed housing having top and bottom casing members, a read/write head for transferring information between said recording media and an external system and a head positioner assembly for locating said head relative to said recording media, the improvement comprising a gasket for sealing a connection between said top and bottom casing members, said gasket including:
    a liner sheet for lateral stability during thermal cycling; and
    opposing layers of polypropylene foam formed on said liner sheet,
    wherein said opposing layers are flame bonded to said liner sheets, and the material composing said liner sheet and said polypropylene foam are the same to optimize the stability of and to minimize the geometric distortion of said gasket during thermal cycling of said disc drive system.

10. A method of forming a gasket for use in a disc drive assembly, comprising the steps of:
    providing a liner sheet of high density polypropylene material configured to approximate the shape of a sealing portion of a disc drive casing, said liner sheet having a top and bottom surface; and
    flame bonding a layer of polypropylene foam to said top and bottom surface of said liner sheet, said polypropylene foam having a lower density than said polypropylene material of said liner sheet, having a similar coefficient of thermal expansion as said polypropylene material of said liner sheet, and being configured in shape to approximate a sealing portion of a disc drive casing.

* * * * *